MAGNETIC RECORDING PLAYBACK CIRCUITS

Filed March 19, 1954 3 Sheets-Sheet 1

INVENTOR
JOHN E. DE TURK
BY Elmer J. Gorn
ATTORNEY

POSITIVE PULSE NEGATIVE PULSE

INVENTOR
JOHN E. DE TURK
BY [signature]
ATTORNEY

Aug. 27, 1957 J. E. DE TURK 2,804,605
MAGNETIC RECORDING PLAYBACK CIRCUITS
Filed March 19, 1954 3 Sheets-Sheet 3

INVENTOR
JOHN E. DE TURK
BY [signature]
ATTORNEY

United States Patent Office 2,804,605

Patented Aug. 27, 1957

2,804,605

MAGNETIC RECORDING PLAYBACK CIRCUITS

John E. DeTurk, Ann Arbor, Mich., assignor to Raytheon Manufacturing Company, Waltham, Mass., a corporation of Delaware Application March 19, 1954, Serial No. 417,362

3 Claims. (Cl. 340—174)

This application relates to magnetic recording playback circuits of the type in which an area magnetized in one polarity represents a "1" and an area magnetized in the opposite polarity represents a "0" in binary notation or in any other codal representation of data, and more particularly to circuit means for distinguishing the output voltage wave forms from areas magnetized in each polarity.

In magnetic recording systems of this type, the passage of a magnetized area of one polarity past the pickup head produces a voltage in the coil that first increases in the positive direction to a maximum, then decreases to zero, then increases in the negative direction to a maximum, and then returns to zero. The passage of a magnetized area of opposite polarity produces a voltage that first increases in the negative direction to a maximum, then decreases to zero, then increases in the positive direction to a maximum, and then returns to zero. It is frequently useful to derive from such pulses a sharp, positive pulse from one type of pickup output and a sharp, negative pulse from the other type of pickup output. In the present invention, this is done by splitting the pickup output which is preferably amplified into wave forms of opposite phase. The wave forms of both phases are rectified in a full-wave rectifier. In the preferred embodiment, the output of the rectifier is differentiated twice and delayed by approximately ¼ of a cycle of the pickup output wave form and applied to each of two gates, one of which receives the output of the phase splitter in one phase, and the other of which receives the output of the first splitter in the opposite phase. The first gate produces a sharp, positive output pulse when the pickup output represents an area of one polarity and no output when it represents an area of the opposite polarity. The second gate produces a sharp, positive output pulse when the pickup output represents an area of the opposite polarity.

In a second embodiment, the output of the full-wave rectifier is applied to both gates without differentiation, and the outputs of the phase splitter are respectively applied after differentiation to the other gate. A result similar to that obtained by the first-described circuit is obtained by this circuit but the first-described circuit is somewhat superior.

Other and further advantages of this invention will become apparent as the description thereof progresses, reference being had to the accompanying drawings wherein.

Figures 3A, 3B, 3C, 3D, 3E, 3F, 3G, 3H, 3I, 3J, 3K, 3L, 3M, 3N, 3O, 3P, 3Q, 3R:
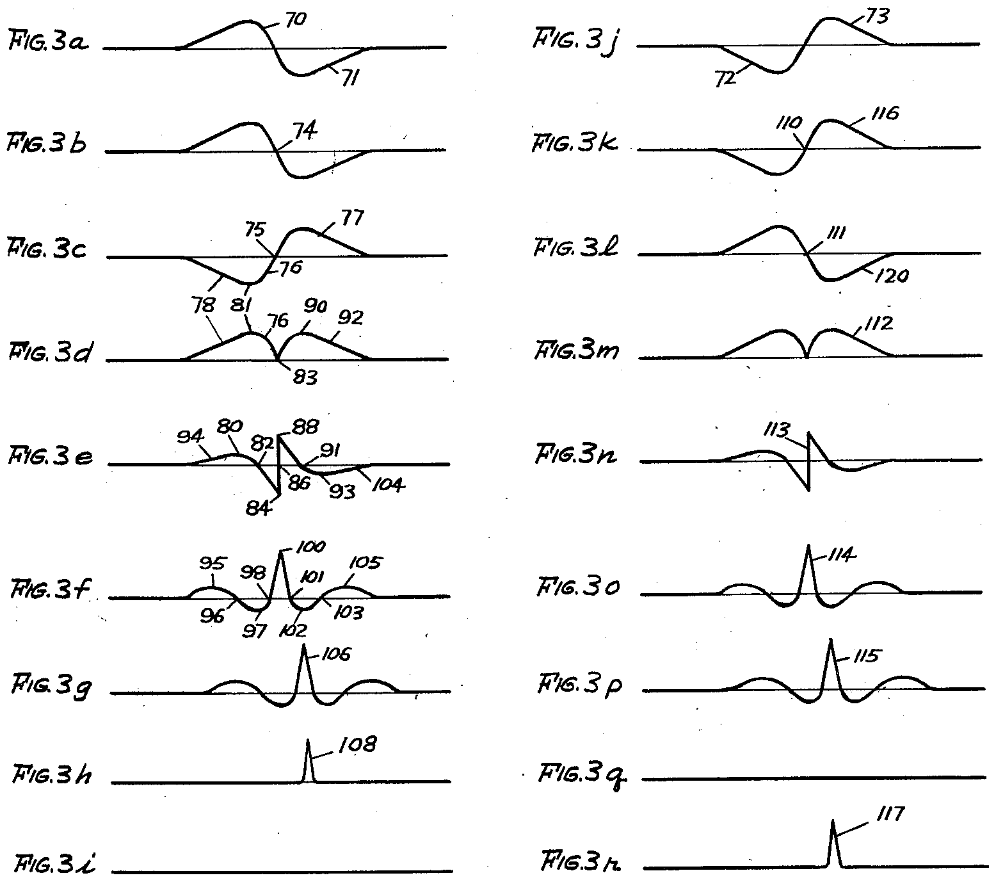
Figure 4:
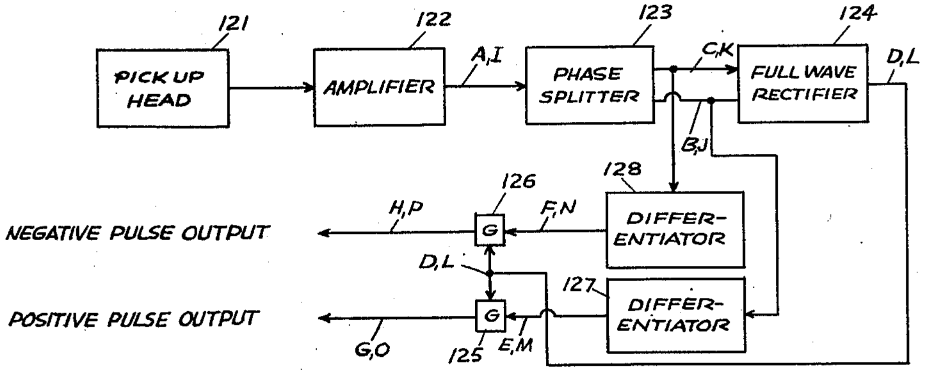
Figures 6A, 6B, 6C, 6D, 6E, 6F, 6G, 6H, 6I, 6J, 6K, 6L, 6M, 6N, 6O, 6P:
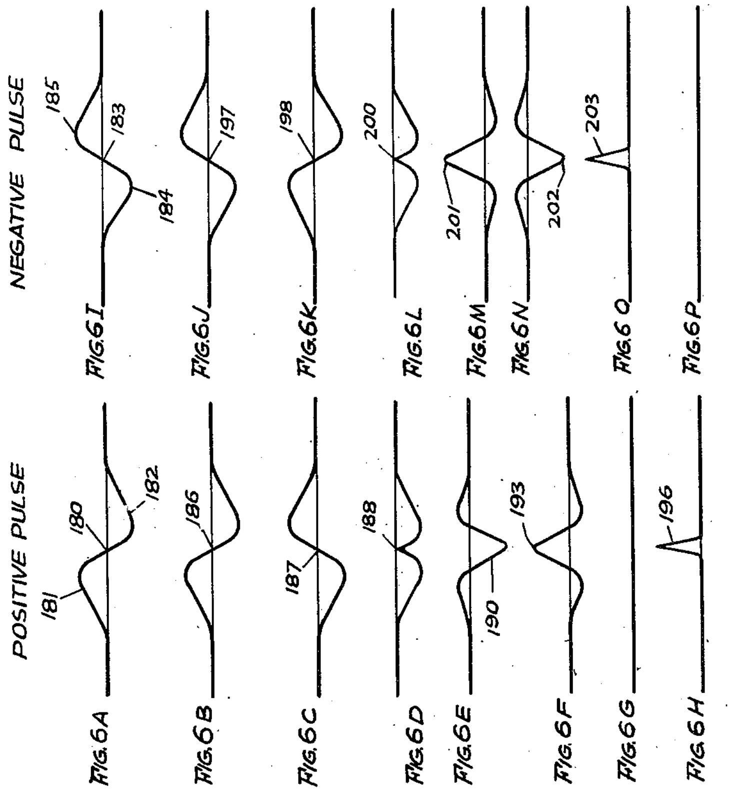
Figure 5:
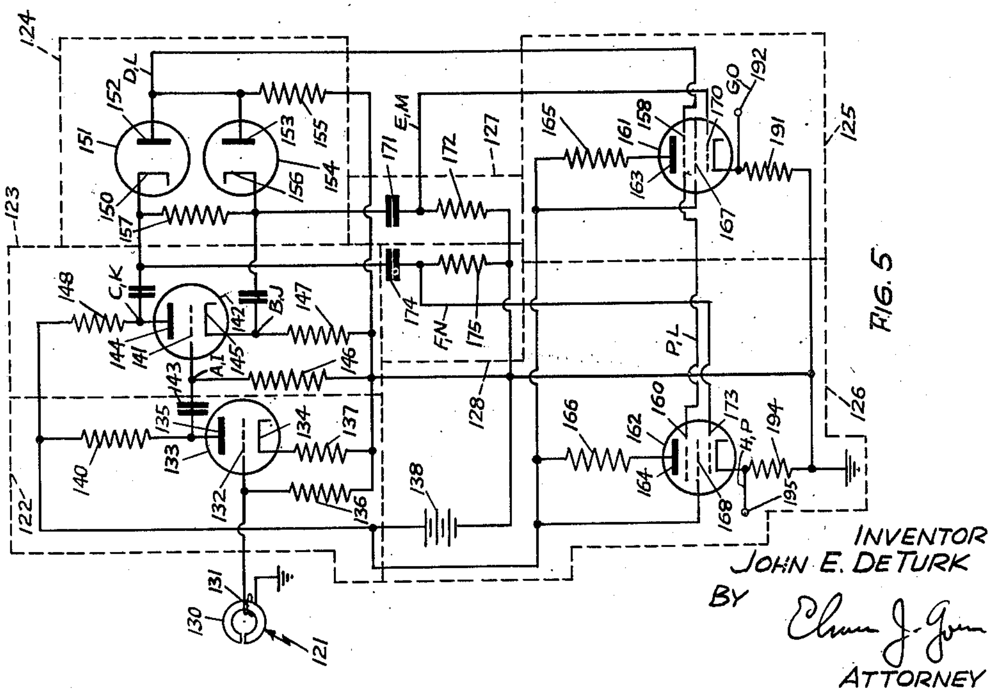

Figs. 3*a* through 3*r* are a series of graphs showing the wave forms at various points in the circuit indicated by corresponding letters;

Fig. 4 is a block diagram of another embodiment of the invention;

Fig. 5 is a schematic diagram of the circuit of the embodiment shown in Fig. 4;

Figs. 6A through 6P are a series of graphs showing the wave forms at various points in the circuit of Figs. 4 and 5, as indicated by corresponding letters.

Figure 1:
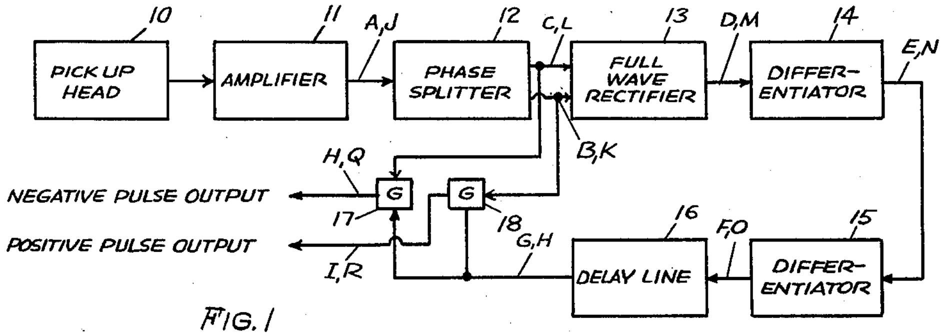
Fig. 1 is a block diagram of a preferred embodiment of the invention.

In Fig. 1, the reference numeral 10 designates a magnetic pickup head, the output of which is connected through an amplifier 11, if required, to a phase splitter 12. Both phases of the output of the phase splitter 12 are rectified in a full-wave rectifier 13. The output of the rectifier is differentiated in a differentiator 14 and again in a second differentiator 15. The output of the differentiator 15 is delayed by approximately a quarter cycle of the original wave form in delay line 16. The delayed pulse is applied to an input of each of two gated amplifiers 17 and 18. One phase of the output of the phase splitter 12 is applied to a second input of the gate 17. The other opposite phase of the output of the phase splitter 12 is applied to the second gate 18.

Figure 2:
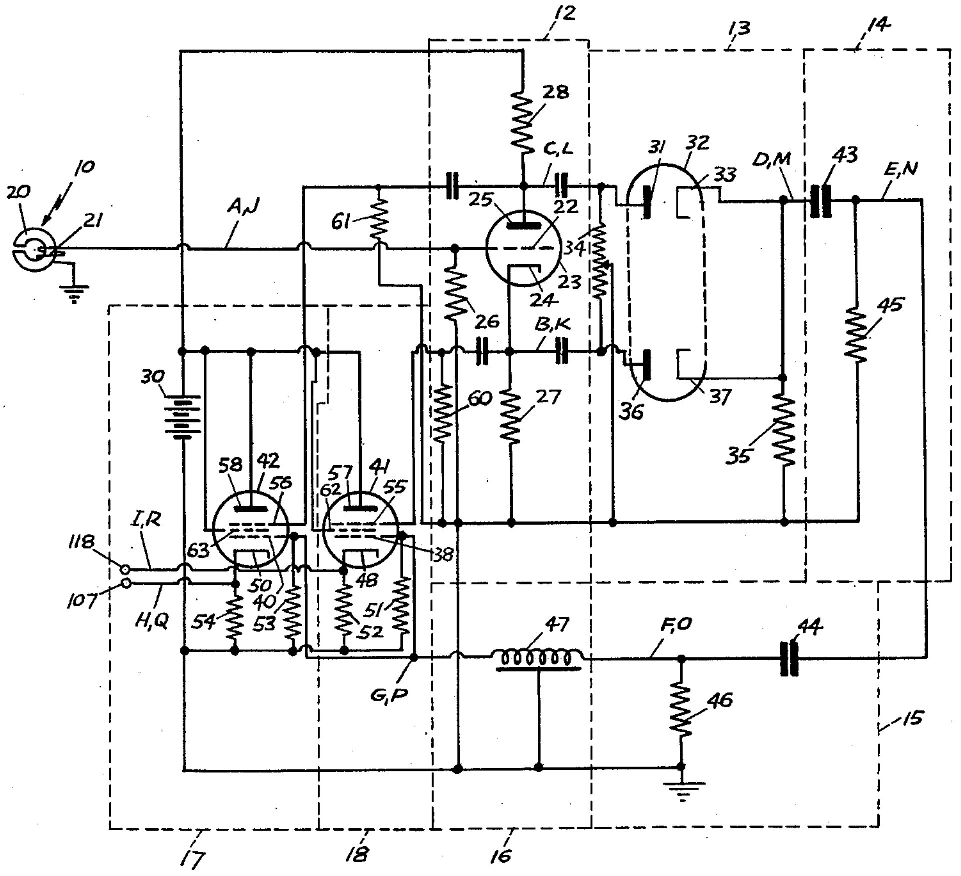
Fig. 2 is a schematic diagram of the circuit of the embodiment shown in Fig. 1.

This circuit is shown more in detail in Fig. 2 where the pickup 10 has a core 20 with a winding 21 connected to the grid 22 of a triode 23 of the phase splitter 12 having a cathode 24 and a plate 25. The grid 22 is connected to the cathode 24 through resistors 26 and 27. The plate 25 is connected to the cathode 24 through a resistor 28, a source 30 of positive potential, and resistance 27. The plate 25 is also coupled to the plate 31 of a dual diode 32 in the full-wave rectifier 13, the cathode 33 of which is connected to a resistor 35. The cathode 24 of the triode 23 is connected to the plate 36 of the dual diode 32, the cathode 37 of which is connected to the resistor 34. The rectified signal voltage which appears across resistor 35 is coupled to the grids 38 and 40 of pentodes 41 and 42 of the gated amplifiers 17 and 18 through differentiating circuits 14 and 15 comprising capacitors 43 and 44 and resistors 45 and 46 and a section of delay line 47 comprising the delay line 16 of Fig. 1. The grids 38 and 40 are also connected to the cathodes 48 and 50 of the pentodes 41 and 42 through resistors 51 and 52 and 53 and 54, respectively. The suppressor grid 55 of the pentode 41 is connected to the cathode 24 of the triode 23. The suppressor grid 56 of the pentode 42 is connected to the plate 25 of the triode 23. The plates 57 and 58 of the pentodes 41 and 42 are connected to the source 30 of positive potential. The screen grids 62 and 63 are connected directly to the source 30.

The operation of the circuit of the invention will be best understood by reference to Figs. 3*a* through 3*r*. Fig. 3*a* represents the voltage wave form produced in the coil 21 by a region of positive magnetization passing the pickup head 10. It will be seen that it comprises first a positive pulse 70 followed by a negative pulse 71. A region of negative magnetization passing the pickup head 10 will produce the wave form shown in Fig. 3*j* which has a negative pulse 72 followed by a positive pulse 73. The voltage wave form of Fig. 3*a* appears in substantially the same form at the cathode 24 of the phase splitter 12, as seen in the graph 74 of Fig. 3*b*. It appears in opposite phase at the plate 25 of the phase splitter 12, as seen in the graph 75 of Fig. 3*c*. The output of the full-wave rectifier 13 is shown in Fig. 3*d*, as two positive-going pulses, the first pulse 76 representing the positive pulse 70 of the wave form of Fig. 3*a* and the second pulse 77 representing the negative pulse 71 of this wave form. In the differentiator 14 comprising capacitor 43 and resistor 45, the maximum slope at the point 78 of pulse 76 produces a voltage maximum at the point 80 in the graph of Fig. 3*c*. The voltage is changed very slowly, if at all, at the peak 81 of the pulse 76 to cause the output of the differentiator to fall to zero at a point 82. The slope of pulse 76 approaches a maximum in the opposite direction at a point 83 to produce a negative maximum 84 in the output of the differentiator and then immediately reverses to a maximum in the opposite direction as represented by a straight line 86 to a point 88. The pulse 77 then reaches a maximum at the point 90 with zero slope to produce zero output from the differentiator at a point 91. It then decreases to zero, reaching a maximum slope at the point 92 to produce a negative maximum output from the differentiator at the point 93 and again returns to zero. It is to be understood that these wave forms are somewhat idealized and that they would only be approximately by a practical circuit.

The output of the differentiator 14 is again differentiated by the differentiator 15. The first point 94 of maximum slope in the output of the differentiator 14 becomes a maximum 95 in the output of the differentiator 15, as shown in Fig. 3*f*, which declines to zero at a point 96 as the input reaches the maximum 80 and again reaches a negative maximum at a point 97 as the input goes through zero, at a point 82 and returns to zero at the point 98 as the input reaches a negative maximum at the point 84. The output of the differentiator 15 reaches a positive maximum 100, theoretically infinite, as the input rapidly reverses its slope in the region represented by the straight line 86 and again passes through zero at a point 101 as the input reaches a positive maximum at the point 88. As the input passes through zero at the point 91, the output of the differentiator 15 reaches a negative maximum at point 102 and again returns through zero at a point 103 as the input reaches a negative maximum at point 93. As the input passes through a point of maximum slope 104, the output reaches a positive maximum at a point 105. The effect of the delay line 16 is shown by the shift of the output of differentiator 15 to the right of the position shown in Fig. 3*f* to the position shown by the wave form 106 in Fig. 3*g* to a position representing a time approximating the occurrence of the second maximum 77 in the output of the rectifier 13.

When this pulse 106 is applied to the grids 38 and 40 of both pentodes 41 and 42, the pentode 42 produces an output due to the fact that at this time the suppressor grid 56 has a positive potential due to the wave form 77 which can be seen to be positive at this time, and an output is developed across the cathode resistor 54 and appears at the terminal 107 in the form of a sharp, positive pulse 108, shown in Fig. 3*h*, with the side irregularities of the wave form of Fig. 3*g* clipped off. As seen in Fig. 3*i*, no output appears across the cathode resistor 52 of pentode 41. Under these conditions, due to the fact that at the time the pulse 106 appears at the grid, the wave form 74 applied to the suppressor grid 55 is negative.

In the case of a magnetized region of negative polarity passing the head 10, a wave form like that shown in Fig. 3*j* appears across its coil 21. This wave form is similarly split in phase by the phase splitter 12 to give wave forms 110 and 111, shown in Figs. 3*k*, 3*l*, respectively, which are applied to the suppressor grids 55 and 56 of the pentodes 41 and 42, respectively. Both of these wave forms 110 and 111 are rectified in the full-wave rectifier 13 to give the two-pulse wave form 112 of Fig. 3*m*. This wave form is differentiated in differentiator 14 to give the wave form 113, shown in Fig. 3*n*, and again in differentiator 15 to give the wave form 114, shown in Fig. 3*o*. The output of the differentiator 15 is delayed in delay line 16 to give the wave form 115 shown in Fig. 3*p*. These wave forms are derived in much the same manner as the similar wave forms for the case of a positive pulse. It will be seen that a positive pulse 116 appears at the suppressor grid 55 of pentode 41 when the pulse 115 appears at the grid 38 to give a sharp, positive pulse 117, shown in Fig. 3*r*, across the resistor 52 to produce an output at the terminal 118. At this time, a negative pulse 120 appears at the suppressor grid 56 of the pentode 42 so that no pulse appears across the cathode resistor 54 and no output appears at the terminal 107, as shown in Fig. 3*q*. The result is that, for a positive pulse, an output appears only in the terminal 107 and for a negative pulse an output appears only at terminal 118. This is the desired result.

Another embodiment of the invention is illustrated in Fig. 4 where the output of a magnetic pickup head 121 is applied to an amplifier 122, if required, and then is split in two opposite phases by a phase splitter 123. The negative excursions of both phases are combined in a full-wave rectifier 124, the output of which is applied to one input each of both gated amplifiers 125 and 126. The gated amplifier 125 also receives one phase of the split signal after differentiation in a differentiator 127, and the gate 126 receives the other phase of the split signal after differentiation in differentiator 128.

The circuit of this embodiment of the invention is shown more in detail in Fig. 5 in which the reference numeral 121 designates the pickup head generally comprising a core 130 upon which is wound a winding 131 connected to the grid 132 of a triode 133 of the amplifier 122 that also has a cathode 134 and a plate 135. The grid 132 is connected to the cathode 134 through resistors 136 and 137. The plate 135 is connected to a source 138 of positive potential through a resistor 140. The plate 135 is also coupled to the grid 141 of the triode 142 of the phase splitter 123 through a capacitor 143. The triode 142 also has a plate 144 and a cathode 145. The grid 141 is also connected to the cathode 145 through resistors 146 and 147. The plate 144 is also connected to the source 138 of positive potential through a resistor 148. The plate 144 is also coupled to the cathode 150 of a diode 151 in the full-wave rectifier 124, the plate 152 of which is connected to a resistor 155. The cathode 156 of the diode 154 is connected to the cathode 145 of the phase splitter tube 142. The plate 153 of the diode 154 is also connected to the resistor 155. The rectified signal which appears across the resistor 155 is applied to both suppressor grids 158 and 160 of two pentodes 161 and 162 in the gated amplifiers 125 and 126, the plate 163 and 164 of which are connected to a source 138 of positive potential through resistors 165 and 166, respectively. The screen grids 167, 168 are also connected to the source 138. The control grid 170 of the pentode 161 is coupled to the cathode 145 of tube 142 through the differentiator circuit 127 comprising capacitor 171 and resistor 172. The control grid 173 of tube 162 is coupled to the plate 144 of tube 142 through the differentiator circuit 128 comprising capacitor 174 and resistor 175.

The operation of this circuit is best understood by reference to Figs. 6A through 6P. As before, a magnetized region representing a positive pulse passing the pickup head 121 generates a voltage pulse across the coil 131 of the wave form 180, shown in Fig. 6A, with a positive pulse 181 occurring first, followed by a negative pulse 182. A magnetized region representing a negative pulse passing the pickup head generates a voltage wave form of the shape 183, shown in Fig. 6I, with a negative pulse 184 followed by a positive pulse 185. As before, in the output of the phase splitter 123, the voltage wave appears in its original phase, as shown by the graph 186, in Fig. 6B, and in opposite phase, as shown in the graph 187 in Fig. 6C. In this embodiment the negative signal excursions of both phases are combined in the fullwave rectifier 124 to produce the double pulse wave form 188, shown in Fig. 6D. The wave form 187 is differentiated in the differentiator 127 to produce the wave form 193, shown in Fig. 6F, which is applied to the control grid 170 of pentode 161. This wave form produces a positive potential at the grid 170 when the center portion of the wave form 188 appears at the suppressor grid 158. The result is that current flows in the cathode-resistor 191 and a positive pulse, 196, shown in Fig. 6H, appears at the output terminal 192. No corresponding pulse output appears at the output terminal 195 of the pentode 162 because the wave form 190, which consists of a negative voltage excursion, is applied to the control grid 173 of the pentode 162; thus, the absence of an output at the terminal 195 is indicated by the straight line wave form shown in Fig. 6G.

In the case of a negative pulse 183 appearing across the coil 131, an out-of-phase signal 198 will appear at the cathode 145 and an in-phase signal 197 at the plate 144 of the phase splitter, as shown in Figs. 6J and 6K. Negative signal excursions are combined in the full-wave rectifier 124 to produce the waveform 200, shown in Fig. 6L. The waveform 198 is differentiated in the differentiator 127 to give the output waveform 202, shown in Fig. 6N, and the waveform 197 is differentiated in differentiator 128 to produce the waveform 201, shown in Fig. 6M. Because the waveform 201 is positive, a signal will appear at the terminal 195 in the form of a sharp, positive pulse 203, as shown in Fig. 6O, and no signal will appear at the terminal 192, as shown by the straight line in Fig. 6P.

It will appear to one skilled in the art that other types of phase splitters and full wave rectifiers than those shown may be used and that additional stages of amplification and other refinements may be needed.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In combination, a magnetic pickup head, a phase splitting circuit, means for applying the output of the pickup head to the input of said phase splitting circuit, a pair of gated amplifiers, means to apply the output of the phase splitting circuit in one phase to one of the said gated amplifiers, means to apply the output of the phase splitting circuit in the other phase to another of said gated amplifiers, full-wave rectifying means, means to apply the output of the phase splitting circuit in both phases to the rectifier, and means to apply the output of the rectifier to both said gated amplifiers to produce an output from only one gated amplifier when the output of the pickup head represents a positive recorded pulse represented by a positive pulse followed by a negative pulse, and an output from only the other gated amplifier when the output of the pickup head represents a negative recorded pulse represented by a negative pulse followed by a positive pulse.

2. In combination, a magnetic pickup head, a phase splitting circuit, means for applying the output of the pickup head to the input of said phase splitting circuit, a pair of gated amplifiers, means to apply the output of the phase splitting circuit in one phase to one of the said gated amplifiers, means to apply the output of the phase splitting circuit in the other phase to another of said gated amplifiers, full-wave rectifying means, means to apply the output of the phase splitting circuit in both phases to the rectifier, two successive means for differentiating the output of said rectifier, means for delaying the differentiated output in phase, means for applying the delayed and differentiated output to both said gated amplifiers to produce an output from only one gated amplifier when the output of the pickup head represents a positive recorded pulse represented by a positive pulse followed by a negative pulse, and an output from only the other gated amplifier when the output of the pickup head represents a negative recorded pulse represented by a negative pulse followed by a positive pulse.

3. In combination, a magnetic pickup head, a phase splitting circuit, means for applying the output of the pickup head to the input of said phase splitting circuit, a pair of gated amplifiers, means to apply the output of the phase splitting circuit in one phase to one of the said gated amplifiers including a differentiating circuit, means to apply the output of the phase splitting circuit in the other phase to the other of said gated amplifiers including a differentiating circuit, a full-wave rectifier, and means to connect the output of said phase splitter in both phases to the rectifier, and means to apply the output of the rectifier to both gated amplifiers to produce an output from one gated amplifier when the output of the pickup head represents a positive recorded pulse represented by a positive pulse followed by a negative pulse, and an output from the other gated amplifier when the output of the pickup head represents a positive recorded pulse and an output from the other gated amplifier when the output of the pickup head represents a negative recorded pulse represented by a negative pulse followed by a positive pulse.

References Cited in the file of this patent

UNITED STATES PATENTS

| | | |
|---|---|---|
| 2,424,961 | Bancroft et al. | Aug. 5, 1947 |
| 2,609,143 | Stibitz | Sept. 2, 1952 |
| 2,675,427 | Newby | Apr. 13, 1954 |